(No Model.) 5 Sheets—Sheet 3.

H. A. STALL.
LINOTYPE MACHINE.

No. 515,623. Patented Feb. 27, 1894.

Witnesses
G. S. Elliott.
E. W. Johnson

Henry A. Stall.
Inventor
by
Attorney

THE NATIONAL LITHOGRAPHING COMPANY,
WASHINGTON, D. C.

(No Model.)
5 Sheets—Sheet 4.
H. A. STALL.
LINOTYPE MACHINE.
No. 515,623.
Patented Feb. 27, 1894.
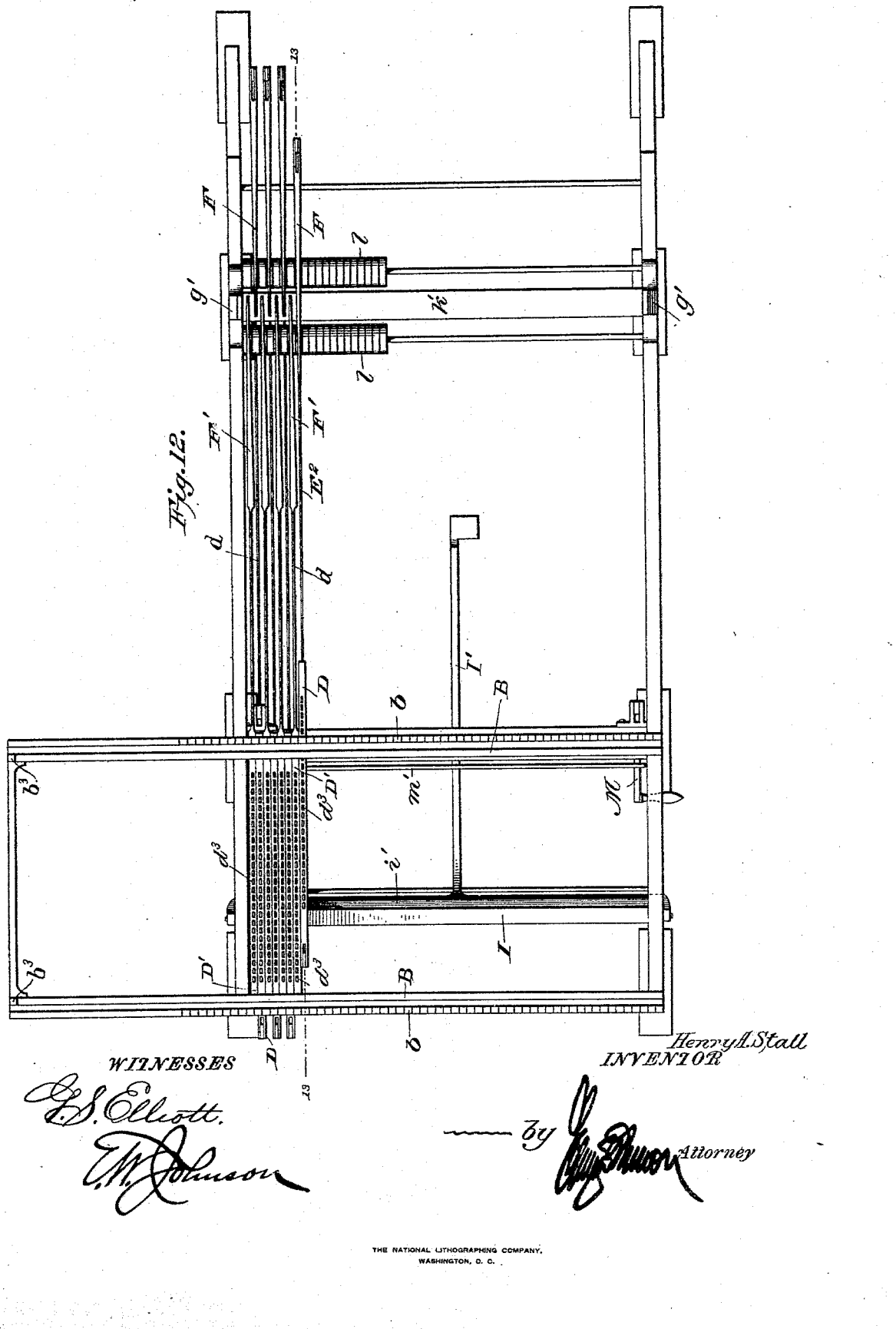
WITNESSES
G. S. Elliott.
T. W. Johnson.
INVENTOR
Henry A. Stall
by ——— Attorney

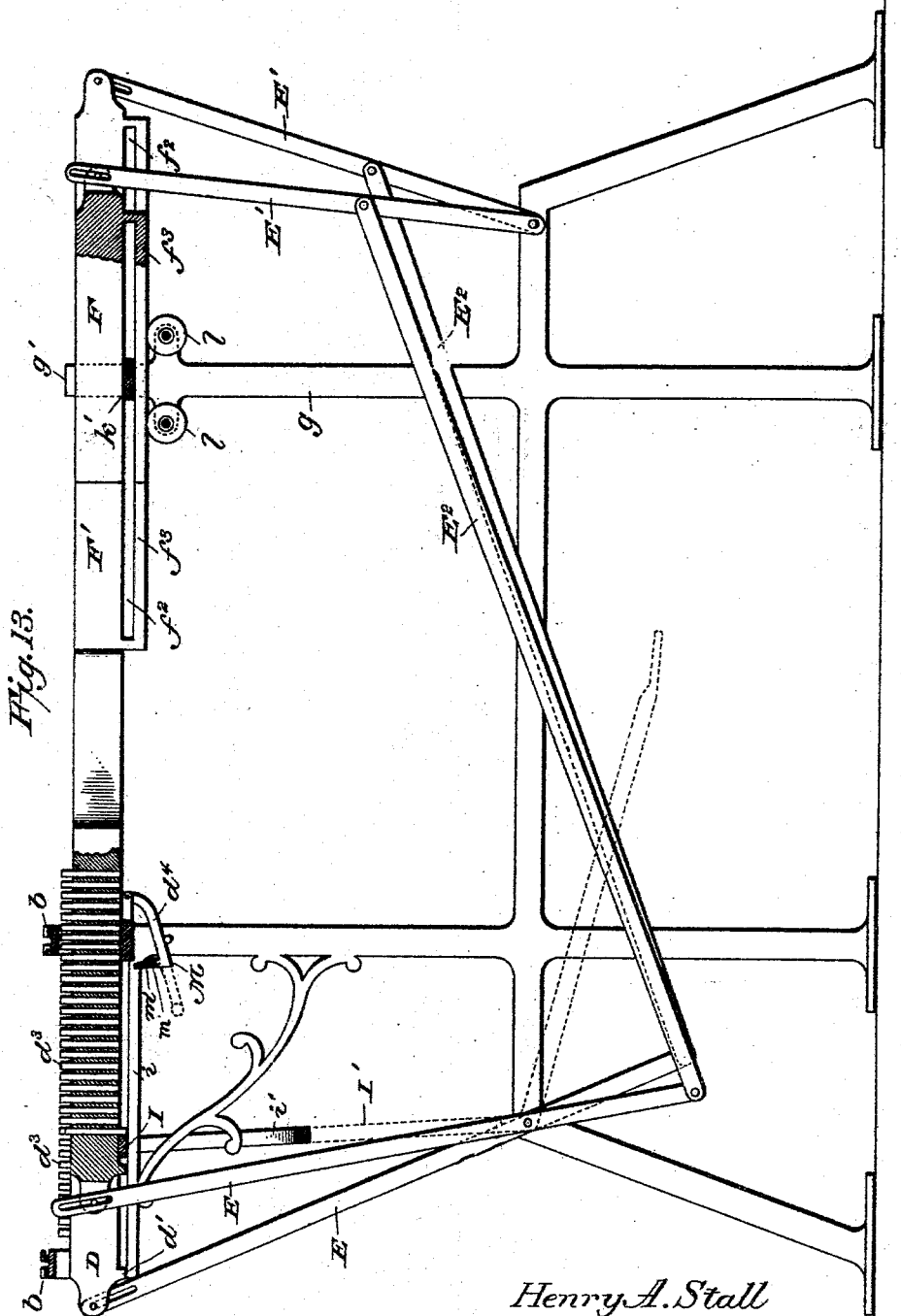

ated February 27, 1894.

UNITED STATES PATENT OFFICE.

HENRY A. STALL, OF PRATTSVILLE, NEW YORK.

LINOTYPE-MACHINE.

SPECIFICATION forming part of Letters Patent No. 515,623, dated February 27, 1894.

Application filed October 7, 1892. Serial No. 448,015. (No model.)

*To all whom it may concern:*

Be it known that I, HENRY A. STALL, a citizen of the United States of America, residing at Prattsville, in the county of Greene and State of New York, have invented certain new and useful Improvements in Linotype-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in linotype machines.

The object of the invention is to provide an improved and simple means for adjusting the frames which carry or are connected to the bars having formed thereon or therein the letters and marks used in printing, so as to bring particular characters in proper alignment; the position of said frames being determined by the manipulation of a key-board which moves from one frame to the other as the keys are depressed, the keys having push-bars which engage with check-keys carried by the frames so as to move said check-keys in the path of a bar carried by a lever which operates the frames; each alternate type-bar or die being connected to its frame by levers and a connecting rod, as will be hereinafter more specifically set forth; and the invention consists in the construction and combination of the parts, as will be hereinafter described and particularly pointed out in the claims.

Figure 1:
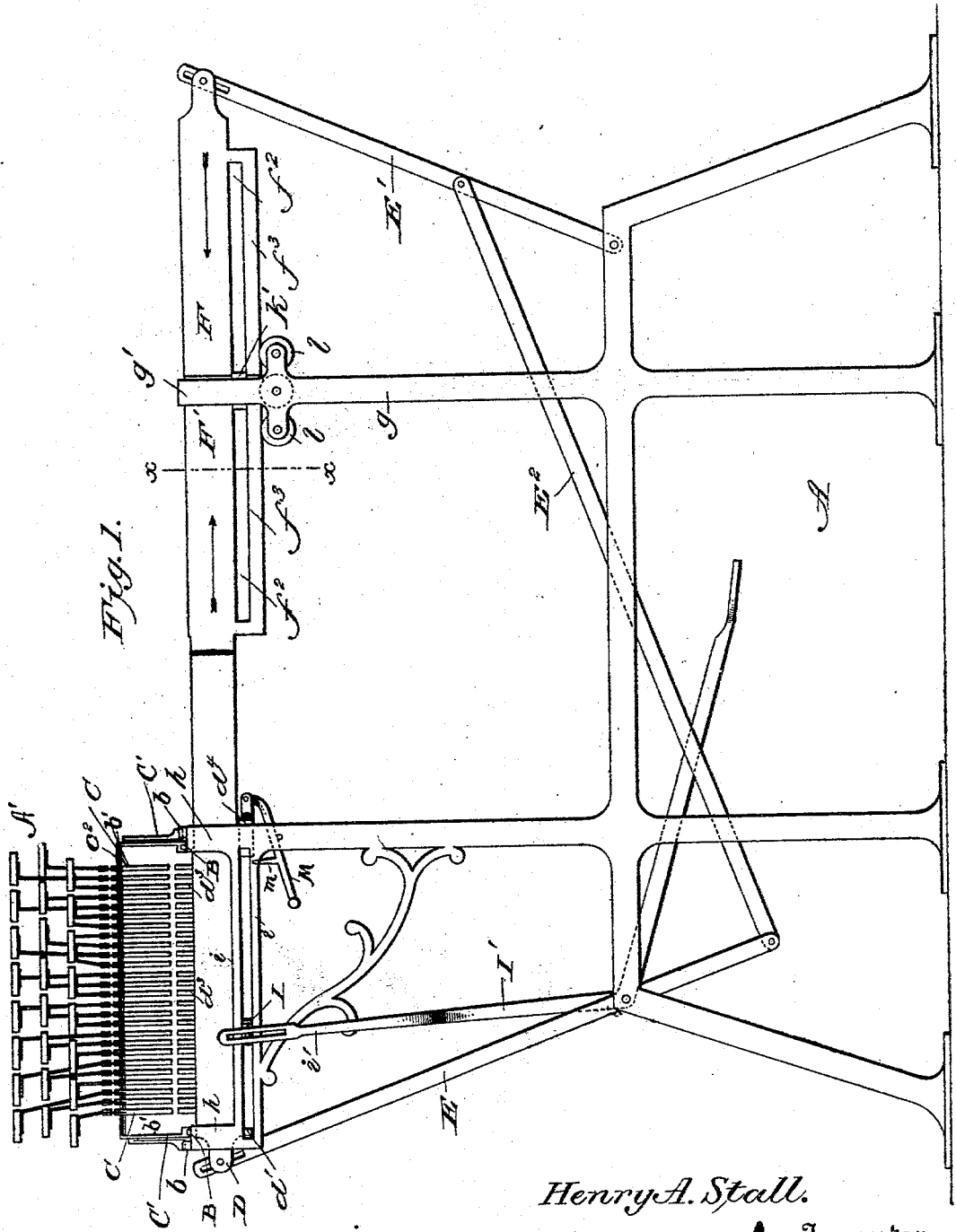
Figure 2:
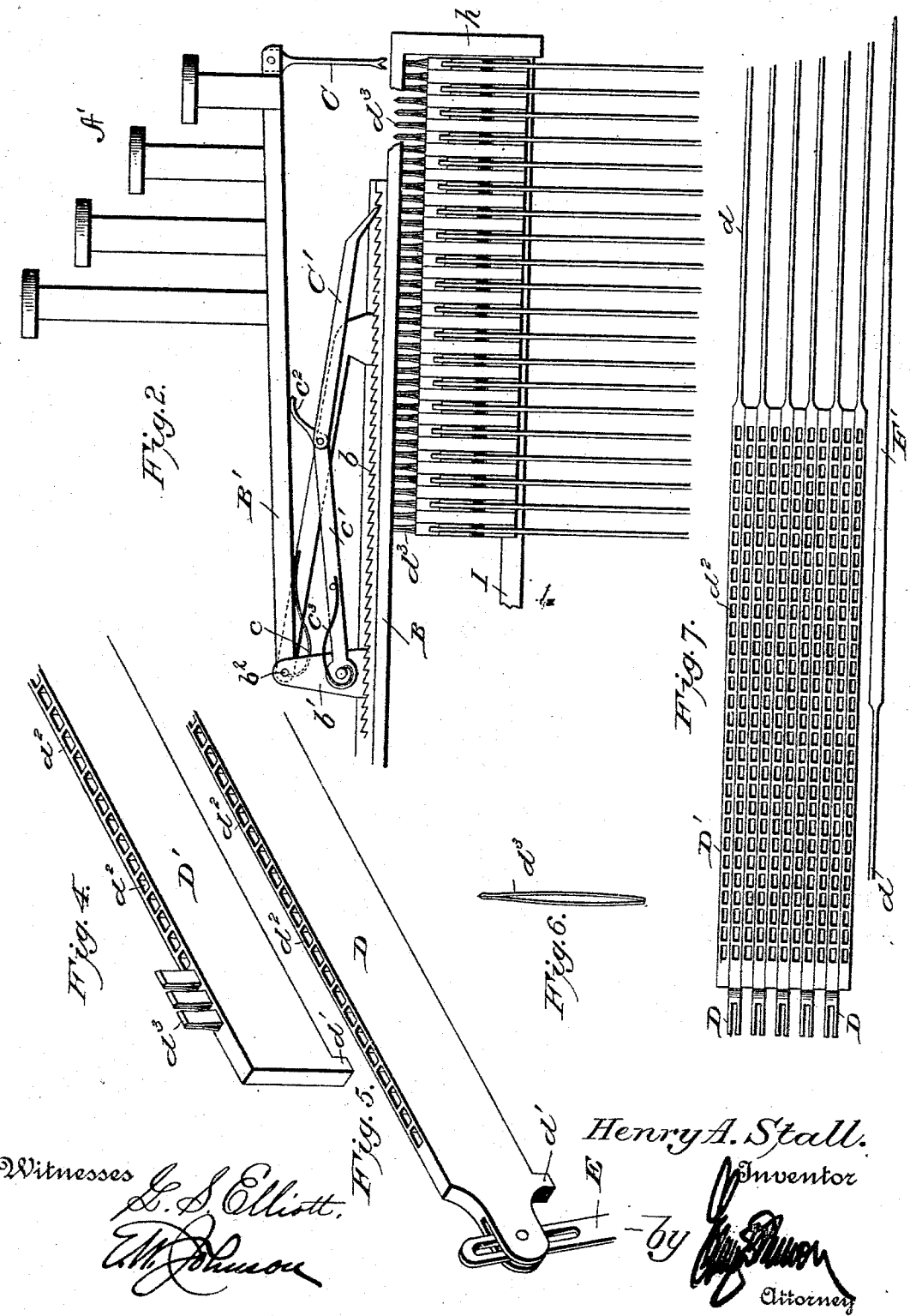
Figure 3:
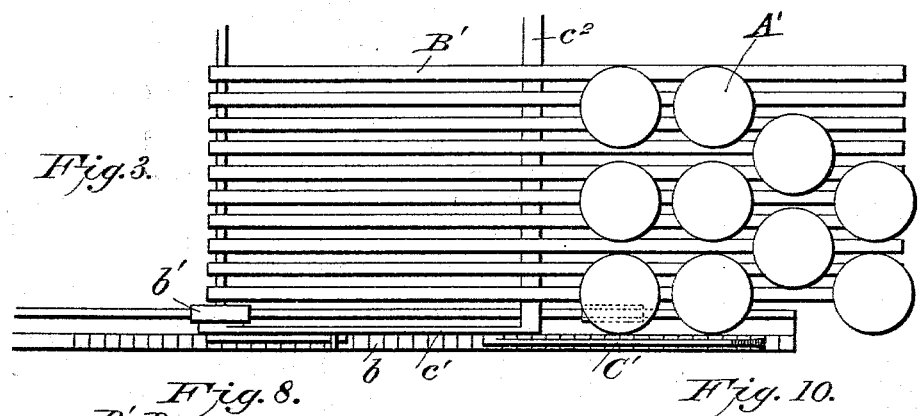
Figures 8, 10:
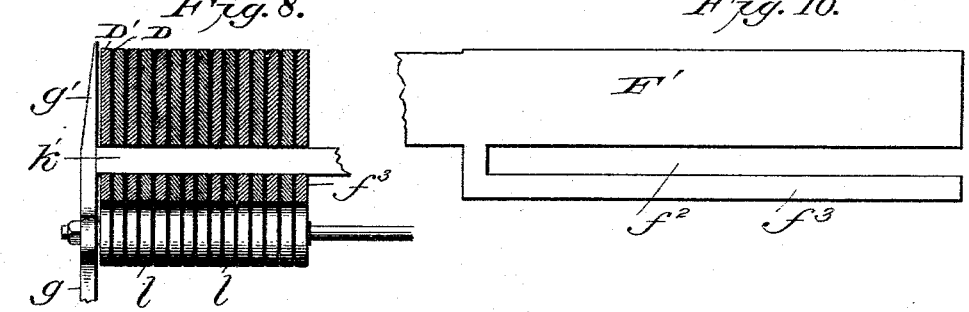
Figure 9:
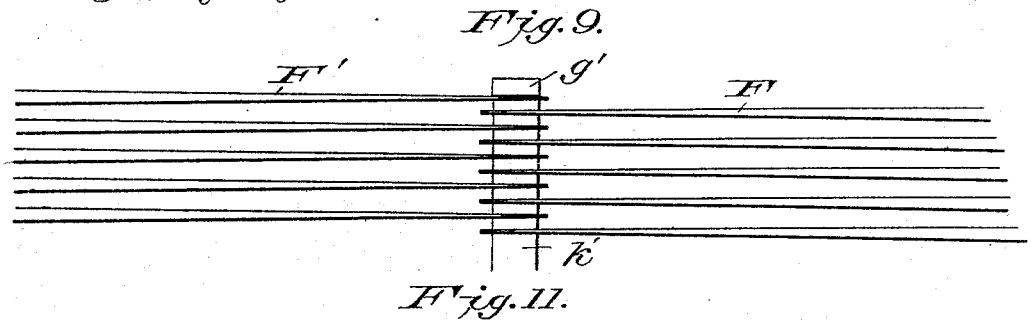
Figure 11:
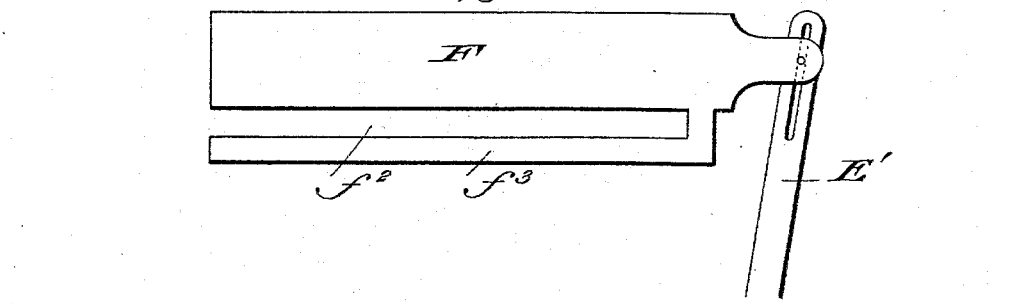

In the accompanying drawings, forming part of this specification: Figure 1 is a side elevation of a portion of a linotype machine, showing only that part which relates to the adjusting or setting of the type-bars or matrices. Fig. 2 is a side elevation of a keyboard and a part of the mechanism connected directly therewith. Fig. 3 is a plan view of the key-board. Figs. 4 and 5 are detail perspective views showing portions of the frames which carry the check-keys. Fig. 6 is an end elevation of one of the check-keys detached. Fig. 7 is a plan view showing the arrangement of the frames which carry the check-keys. Fig. 8 is a sectional view through the line $x$—$x$ of Fig. 1, the same showing the type-bars or matrices. Fig. 9 is a plan view showing the arrangement of the oppositely movable type-bars or matrices. Figs. 10 and 11 are side elevations of the type-bars or matrices. Fig. 12 is a plan view of the machine with the keyboard left off, and Fig. 13 is a sectional view on the line 13—13 of Fig. 12.

A designates the supporting frame, which may be of any suitable construction, having a support for the movable key-board A' and mechanism carried thereby, supports for a foot-lever and for levers connected to each alternate frame and type-bar or matrix, and also supporting means for said type-bars or matrices. The keyboard is movably supported upon the frame A by means of side frames or standards $b'$ which slide upon tracks B and are connected to each other by a bar $b^2$ upon which the levers of the finger-keys are mounted. The tracks B are preferably arranged at right angles to the movement of the stop-bars to which the type-bars or matrices are connected, and adjacent to these tracks, and parallel thereto, are ratchet-bars $b$ with which engage the mechanism for advancing the keyboard. The levers B' of the finger-keys are held normally elevated by springs $c$, and to the forward end of each lever is pivotally attached a depending push-bar C the lower end of which is notched to better engage with the adjustable stops carried by the stop-bars D and D', which will be hereinafter described. The finger keys of the levers are lettered or marked to correspond with the letters or marks on the type-bars or matrices. To the lower portion of each standard or support $b'$ is pivoted an arm $c'$, said arms being connected to each other at their forward ends by a bar $c^2$ which lies beneath the levers of the finger keys. The arms $c'$ $c'$ carrying the transverse bar $c^2$ are held normally elevated by the springs $c^3$, and to said arms are pivoted gravity pawls C' which engage with the ratchet bar or bars $b$, so that when the arms are depressed by one of the levers B' bearing on the bar connecting the same the key-board will be moved one step.

There are two kinds of stop-bars which carry the adjustable stops used with the apparatus, the one designated by the letter D being the shorter and is connected to the type-bar by the levers E and E' and connecting rod $E^2$, while the one designated by the letter D' is connected directly to the type-bar by the connecting portion $d$. The outer end of each stop-bar is provided with a downwardly projecting lug $d'$, the purpose of which will be hereinafter set forth.

The type-bars or matrices F and F' are tapered longitudinally as shown and the stop-bars carrying the adjustable stops are connected to the wider ends thereof, each alternate type-bar, or the ones lettered F, being turned end to end so as to position the narrow ends between the narrow ends of the type-bars F' located above the support $k$ carried by the standards $g$ on the main frame A. So that when a number of the type-bars are brought together in taking an impression they will properly align. By connecting the stop-bars to the type-bars as hereinbefore described the movement of the stop-bars in one direction will move the type-bars F and F' toward each other as the stop-bars D' being connected directly to the type-bars F' will move said type-bars in the same direction they move, while the stop-bars D being connected to the type-bars F by means of the levers E and E' and connecting rod $E^2$ will move said type-bars in an opposite direction, it being noted that the connecting rod $E^2$ is connected to the lever E below its fulcrum and to the lever E' above its fulcrum.

The frame A between the supports $h$ $h$ which support the tracks upon which the key-board travels is provided with horizontal guide-bars $i$ $i$ between which is a space in which slide the ends of a horizontal bar I the extremities of which engage with the slotted ends of the upper members $i'$ of a foot-lever I', and this transverse bar is adapted to engage with the lower ends of the adjustable stops when depressed or forced through the apertures $d^2$ in the stop-bars D and D', so as to move said stop-bars until the adjustable stops abut against the stop $d^4$, which movement will bring the characters corresponding to the adjustable stops depressed in a single line between the upwardly projecting portions $g'$.

To bring the adjustable stops to their normal position I pivot to brackets attached to the outer edge of the stop-bar $d^4$ levers M provided with upwardly extending portions $m$ which are connected to each other by a bar $m'$, so that by operating one of said levers the connecting bar will force the adjustable stops to their normal position; as when a line is formed the adjustable stops which have been depressed to form said line are immediately above said connecting bar. After the adjustable stops have been replaced the stop-bars are returned in position to be operated upon to form a new line by means of the bar I, which when it is moved by the lever I' will push against the downwardly-projecting lugs $d'$ of the stop-bars.

The tapered type-bars or matrices F and F' are provided at their lower portions with an open ended slot $f^2$ which receives the guide bar $k'$ carried by the upper part of the standard or upright $g$ of the main frame and serves to guide said type-bars. The lower edge, $f^3$ of the type-bars rests upon rollers $l$ $l$ and slide thereon when moved, the central series of rollers being located directly beneath the guide bar $k'$ while the outer rollers are supported by bearings which extend on each side of the standards or uprights $g$, so that each type-bar when moved will move over three rollers as shown in Fig. 1.

The narrow ends of the type-bars or matrices are used as spaces or justifying wedges for which purpose finger-keys and adjustable stops are provided, and the arrangement of the characters on these type-bars may be as follows: The period, colon, semi-colon, comma will be on the narrow end of the bar while the letters of the alphabet having the least width will follow progressively, and after the small letters will follow the capital letters. The number of letters and characters on the type-bars corresponds with the number of adjustable stops carried by the stop-bars, as well as the number of keys on the key-board; so that, for instance if the key marked with a capital H is depressed an adjustable stop carried by one of the stop-bars D D' will be depressed, said adjustable stop corresponding with the letter H on one of the type-bars F F', so that when that particular stop-bar is moved by operating the foot lever as hereinbefore described the type-bar will be moved to bring the letter H to the proper position above the bar $k'$.

If desired the type-bars may be provided with intermediate blank spaces, in which case corresponding adjustable stops and finger-keys are arranged for bringing said spaces into position.

The adjustable stops $d^3$ are preferably made up of two strips of resilient metal secured together at one end, leaving the other ends free, each plate having a slight outward curvature of sufficient resiliency to maintain them in position in the apertures $d^2$ of the stop-bars. The upper ends are beveled so that they can be better engaged by the forked or bifurcated ends of the push-bars C.

In operation the apparatus is set so that the parts will be organized as shown in Fig. 1, the ends of the type-bars or matrices resting between the upper ends of the uprights $g$ $g$ of the main frame, and the key-board being drawn forward. The first step is the manipulation of the finger-keys to set the line of matter desired, the first finger-key struck operating one of the adjustable stops in the first stop-bar, the depression of the stop moving the key-board away from the operator one step or immediately above the second stop-bar, and this operation is continued until sufficient keys have been struck to form a line of the desired length. When the key-board reaches the limit of its movement it may contact with a suitable stop $b^3$ located on the supporting frame. Now to adjust the type-bars or matrices the foot-lever is depressed to cause the cross-bar I to strike against the adjustable stops and move the stop-bars until said adjustable stops reach the stop $d^4$, the movement of the stop-bars operating to bring the letters or characters corresponding with the finger-keys depressed in a line with each other. After the type-bars have been arranged in line a paper matrix may be formed therefrom in the usual manner, or a metallic line of type made from molten metal, and for this reason the characters may be either in relief or in intaglio. When the impression has been taken the stop-bars are returned as hereinbefore described and the keyboard moved to its forward position by releasing the pawls and sliding said keyboard upon the tracks.

Having thus described my invention, what I claim as new, and desire to secure by Letters Patent, is—

1. In a machine for producing printing bars, the combination, of a frame or support, a carriage movable thereon and having finger-keys each one of which is provided with a depending push-bar, stop-bars supported on the frame and connected to type-bars or matrices, adjustable stops carried by the stop-bars and adapted to be engaged by the push-bars, and means for moving the stop-bars and type-bars attached thereto by engaging the adjustable stops, substantially as shown.

2. In a machine for producing printing bars, the combination, of a frame or support, a carriage movable thereon and having finger-keys each one of which is provided with a depending push-bar, stop-bars supported on the frame and connected to type-bars or matrices, adjustable stops carried by the stop-bars and adapted to be engaged by the push-bars, and a lever pivoted to the frame and provided with a cross-bar which is adapted to be moved along the under side of the stop-bars to engage the adjustable stops, substantially as described.

3. In a machine for producing printing bars, the combination with a series of horizontally movable stop-bars supported upon a frame and each carrying a series of adjustable stops for the purpose set forth, of tapered type-bars or matrices located alternately end to end and connected to the stop-bars, substantially as shown.

4. In a machine for producing printing-bars, the combination with a series of stop-bars supported upon a frame and having adjustable stops for the purpose set forth, of two sets of type-bars or matrices connected to the stop-bars and positioned so that the end of one set will lap the end of the other, the type-bars or matrices being connected to the stop-bars so that the movement of said stop-bars in one direction will move the two sets of type-bars in opposite directions, substantially as shown, and for the purpose set forth.

5. In a machine for producing printing bars, the combination, with a series of stop-bars supported upon a frame and having adjustable stops for the purpose set forth, of two sets of type-bars or matrices positioned so as to lap, each type-bar of one set being connected directly to its stop-bar while the type-bars of the other set are connected to their stop-bars by levers, substantially as shown and described.

6. In a machine for producing printing bars having type-bars connected to stop-bars carrying adjustable stops, a carriage carrying a series of levers with finger-keys, push-bars attached to the levers for engagement with the adjustable stops, and a cross-bar with which the levers of the finger-keys contact supported by the carriage and having a pawl which engages with a rack-bar, substantially as shown and for the purpose set forth.

7. In combination with a movable carriage, each key supporting lever having an independent push-bar for depressing an adjustable stop, means for advancing the carriage one step, stop-bars having apertures in which the adjustable stops are located, type-bars connected directly to every other stop-bar, the other stop-bars being each connected to its type-bar by levers and connecting rod, substantially as shown and for the purpose set forth.

8. In combination with the stop-bars D and D' having adjustable stops and depending portions or lugs $d$, a bar adapted to engage therewith and with the adjustable stops, of a pivoted plate provided with an operating lever adapted to engage with the adjustable stops for elevating the same when the sliding bar is moved in an opposite direction, said inclined plate being held normally out of the path of the adjustable stops, substantially as shown.

9. In combination with the type-bars or matrices, the movable stop-bars connected thereto each having a series of adjustable stops.

10. As an improved article of manufacture, an adjustable stop made up of spring plates secured to each other at one end, substantially as shown, and for the purpose set forth.

11. An adjustable stop for the purpose set forth, consisting of two plates connected to each other, the upper end of said plates being beveled, substantially as shown.

12. In combination with an adjustable stop having a beveled upper end and a spring body portion, of a push bar having a notched or bifurcated lower end, for the purpose set forth.

13. In a machine for producing a printing bar having type-bars or matrices and stop-bars with adjustable stops, a foot lever pivoted to the frame of the machine, and a connecting bar attached to the lever and guided to move along the under side of the stop-bars by the movement of the lever, substantially as shown, and for the purpose set forth.

In testimony whereof I affix my signature in presence of two witnesses.

HENRY A. STALL.

Witnesses:
WILKINS X. GRAHAM,
HIRAM M. BOUTON.